Patented July 5, 1932

1,865,917

UNITED STATES PATENT OFFICE

OSCAR KASELITZ AND WALTER KATZ, OF BERLIN, GERMANY

RECOVERY OF NITROGEN OXIDES

No Drawing. Application filed January 29, 1931, Serial No. 512,198, and in Germany May 20, 1930.

Our invention refers to methods of recovering nitrogen oxides from nitrosyl chloride or from gas mixtures containing same, and is especially adapted to improve the process disclosed in a copending application for patent of the United States Serial No. 371,707, filed June 17, 1929, by Bruno Uebler.

In the specification forming part of the application aforesaid is described a process of producing nitrates from chlorides and nitric acid or nitrous gases, wherein nitrosyl chloride is formed. According to the prior application the nitrosyl chloride contained in the waste gases resulting in the manufacture of potassium nitrate was decomposed by conducting it in contact with iron or an iron compound, such as ferrous chloride to liberate the nitrogen oxide. The reaction occurs according to the equation:

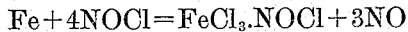

$$Fe + 4NOCl = FeCl_3.NOCl + 3NO$$

wherein 75% of the nitrogen employed in the starting reaction are recovered, 25% of the nitrogen oxide and all of the chlorine being retained. The addition compound of NOCl and ferrous chloride formed according to the above equation was decomposed in order to reutilize the nitrogen.

In the practical operation of this process difficulties have been encountered, which arise from the fact that the addition compound melts already at a slightly raised temperature, while in order to completely decompose it, a temperature of about 300° C. must be considerably overstepped.

According to the present invention now we succeed in greatly simplifying this process, being enabled to recover in a single operation all of the nitrogen, while retaining all of the free chlorine as well as the chlorine bound to nitrogen.

In practicing our invention we conduct the nitrosyl chloride either by itself or together with chlorine and nitrogen oxides in contact with heated iron, whereby all the chlorine is bound, while nitrogen monoxide free from chlorine or a mixture of nitrogen monoxide and nitrogen dioxide escapes, which may be returned into the operation. This reaction occurs at 300° C. without any losses. The metallic iron may also be replaced by ferric nitrate.

The quantity of heat required to attain the reaction temperature can be supplied together with the reaction gases, which may be heated to the required temperature.

*Example*

A mixture of nitrosyl chloride, such as obtained in producing potassium nitrate from potassium chloride and concentrated nitric acid or nitrous gases, is conducted over iron scrap (iron turnings) at a temperature of about 300° C. The gas mixture escaping from the reaction chamber is free from chlorine, but contains all the nitrogen. The chlorine is bound to iron to form anhydrous ferric chloride, while all the nitrogen is recovered in the form of nitrogen oxides.

The term "mass containing iron in a form capable of chemically binding chlorine" as used in the appended claims is intended to cover metallic iron and ferric nitrate exclusively.

Various changes may be made in the details disclosed in the foregoing specification without departing from the invention or sacrificing the advantages thereof.

We claim:—

1. The method of recovering nitrogen oxides from nitrosyl chloride or mixtures containing same comprising conducting the gas at an elevated temperature in contact with metallic iron.

2. The method of recovering nitrogen oxides from nitrosyl chloride or mixtures containing same comprising conducting the gas at an elevated temperature in contact with ferric nitrate.

3. The method of recovering nitrogen oxides from nitrosyl chloride or mixtures containing same comprising conducting the gas in contact with heated metallic iron.

4. The method of recovering nitrogen oxides from nitrosyl chloride or mixtures containing same comprising conducting the gas in contact with heated ferric nitrate.

5. The method of recovering nitrogen oxides from nitrosyl chloride or mixtures containing same comprising conducting the gas heated to reaction temperature in contact with metallic iron.

6. The method of recovering nitrogen oxides from nitrosyl chloride or mixtures containing same comprising conducting the gas heated to reaction temperature in contact with ferric nitrate.

7. The method of recovering nitrogen oxides from nitrosyl chloride or mixtures containing same, comprising conducting the gas at an elevated temperature in contact with a mass containing iron in a form capable of chemically binding chlorine.

8. The method of recovering nitrogen oxides from gas mixtures containing nitrosyl chloride and free chlorine, comprising conducting the gas at an elevated temperature in contact with a mass containing iron in a form capable of chemically binding chlorine.

9. The method of recovering nitrogen oxides from gas mixtures containing nitrosyl chloride and free chlorine, comprising conducting the gas at an elevated temperature in contact with metallic iron.

In testimony whereof we affix our signatures.

OSCAR KASELITZ.
WALTER KATZ.